INVENTORS
HENRY W. FRANZ
MICHAEL L. GONSHOR
BY
Mallinckrodt and
Mallinckrodt
ATTORNEYS

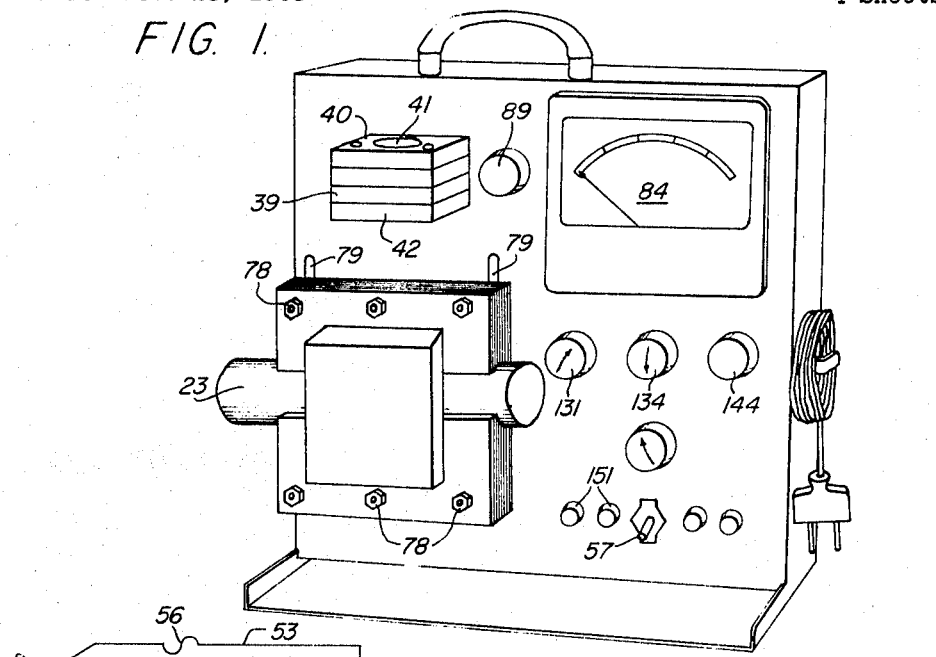

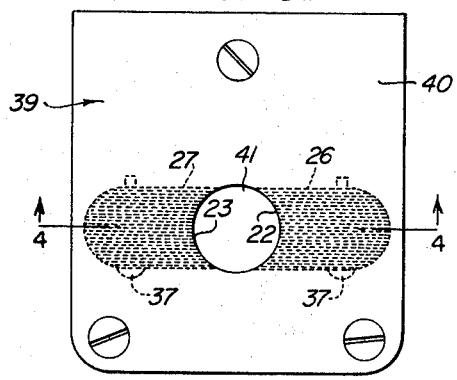
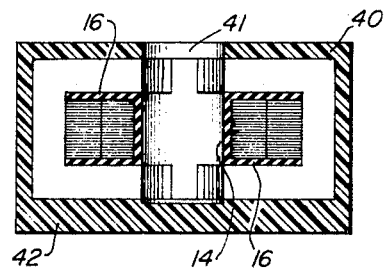
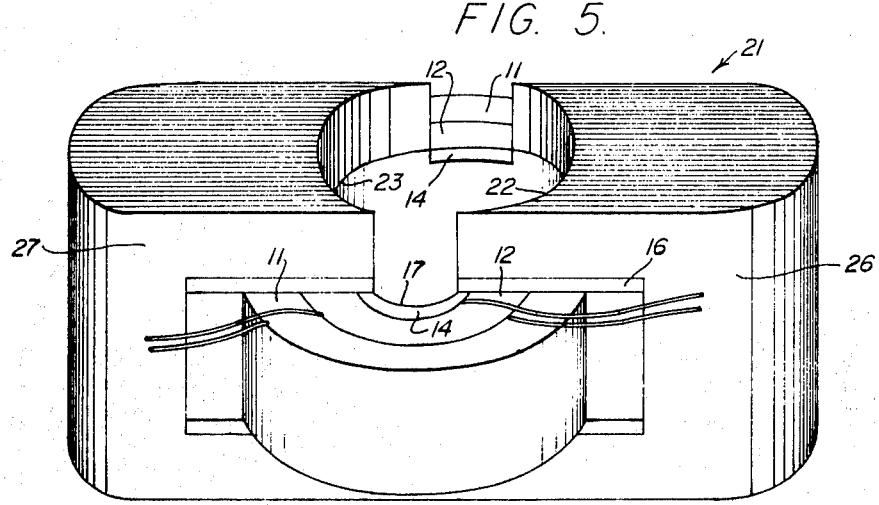
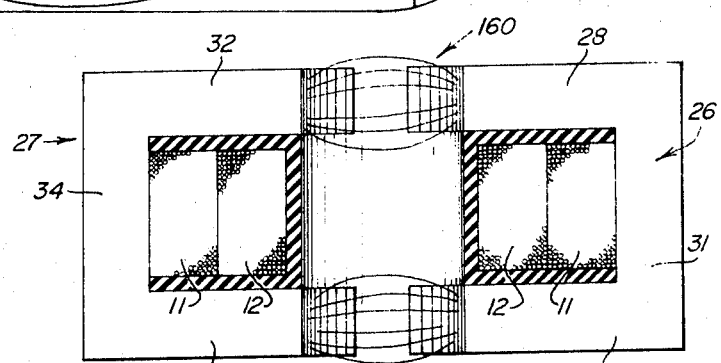
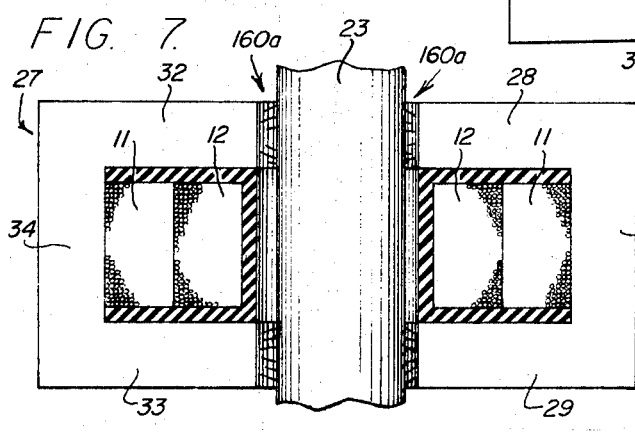
INVENTORS
HENRY W. FRANZ
MICHAEL L. GONSHOR Oct. 20, 1970 H. W. FRANZ ET AL 3,535,619
SHELL-TYPE TRANSFORMER INSTRUMENT FOR DETERMINING THE
AMOUNT OF MAGNETIC MATERIAL IN A SUBSTANCE WHEREIN
A SAMPLE OF THE SUBSTANCE FUNCTIONS AS
THE CENTER LEG OF THE TRANSFORMER
Filed Feb. 28, 1968 4 Sheets-Sheet 3

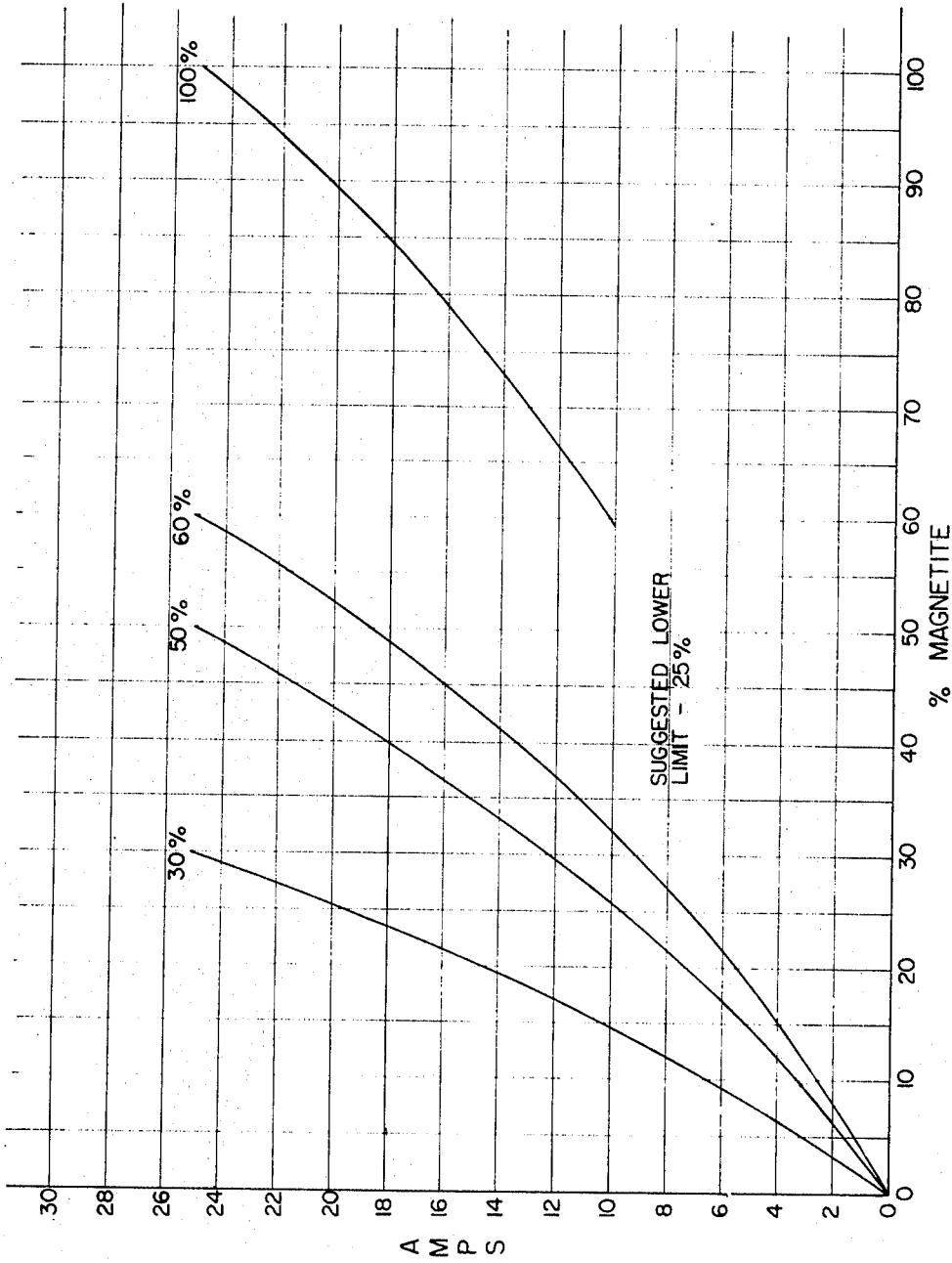

United States Patent Office 3,535,619
Patented Oct. 20, 1970

3,535,619
SHELL-TYPE TRANSFORMER INSTRUMENT FOR DETERMINING THE AMOUNT OF MAGNETIC MATERIAL IN A SUBSTANCE WHEREIN A SAMPLE OF THE SUBSTANCE FUNCTIONS AS THE CENTER LEG OF THE TRANSFORMER
Henry W. Franz, Salt Lake City, Utah, and Michael L. Gonshor, Jidda, Saudi Arabia, assignors to Kennecott Copper Corporation, New York, N.Y., a corporation of New York
Filed Feb. 28, 1968, Ser. No. 709,069
Int. Cl. G01n 27/00; G01r 33/12
U.S. Cl. 324—13
8 Claims

ABSTRACT OF THE DISCLOSURE

A powdered sample of material to be tested or a core sample obtained from core drilling operations is placed in a cavity in a magnetic circuit to function as the center leg of a shell-type transformer. The primary winding of the transformer is energized, and the resulting current flow in the secondary winding is read from an ammeter connected in the secondary circuit. The percentage of magnetic material in the sample is determined from a standard plot of amperes versus percent magnetite.

BACKGROUND OF THE INVENTION

Field

The invention relates to devices for determining the proportion of magnetic material present in a substance. It is specifically concerned with a portable instrument for testing samples of a substance.

Prior art

There are available a number of devices for determining the presence of material having magnetic characteristics. Magnetometers are well known, for example. Also, chemical methods for the qualitative and quantitative testing for magnetic materials are well known. Presently available methods are generally quite complicated and are not readily usable in the field. Heretofore, samples have been removed from the field and sent to a laboratory for analysis. This procedure takes time and is thus costly.

SUMMARY OF THE INVENTION

In general, the invention provides a portable instrument that can determine the magnetic content of either a powdered sample or a core sample. The sample is inserted in a receptacle of the instrument, and a reading that corresponds to the percentage of magnetic material contained in the sample is taken from a meter on the instrument. More specifically, the sample to be tested is placed in the center leg position of a shell-type transformer. Power is applied to the primary winding and a reading is obtained on an ammeter connected in the secondary winding circuit. This reading corresponds to the percentage of magnetic material, referred to herein as "magnetite," in the sample. The percentage magnetite in the material is determined from previously prepared curves connecting plots of microamps versus percent magnetite. Prior to the test, the instrument is calibrated to match a particular curve which has been calibrated to a sample containing a known percent magnetite.

BRIEF DESCRIPTION OF THE DRAWINGS

The accompanying drawings illustrate what is presently contemplated as the best mode of carrying out the invention.

In the drawings:
FIG. 1 is a perspective view of the instrument.
FIG. 2 is a wiring diagram of the circuitry utilized.
FIG. 3 is a top plan view of the powder analyzer unit.
FIG. 4 is a sectional view taken along the line 4—4 in FIG. 3.
FIG. 5 is a fragmentary perspective view of an analyzer unit showing the magnetic circuit.
FIG. 6 is a diagrammatic sectional view of the core analyzer unit showing the magnetic circuit.
FIG. 7 is a view similar to FIG. 6 with the sample in the test cavity.
FIG. 11 is a drawing showing the calibration curves used with the unit.

DETAILED DESCRIPTION OF PREFERRED EMBODIMENTS

Figure 8:
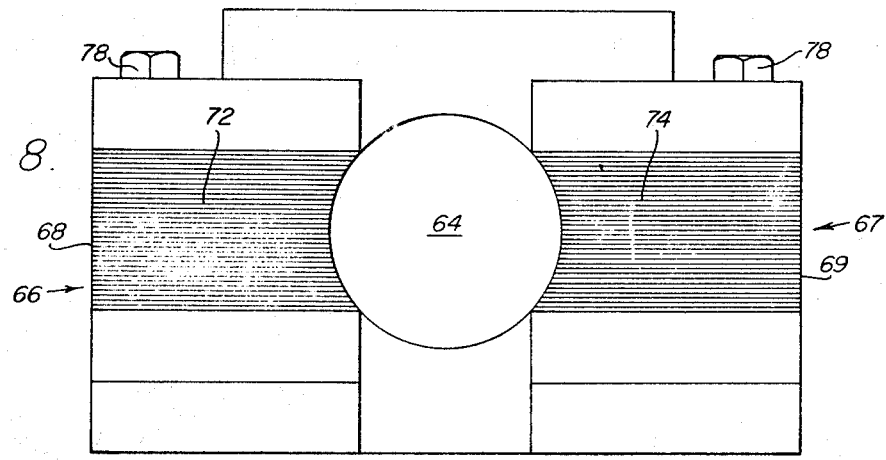
FIG. 8 is an end view of the core analyzer unit.

Referring now to the drawings, the invention is shown embodied in a portable instrument adapted to be used either in the field or in the laboratory. The instrument is designed to test either powder samples or solid samples, such as cores obtained from a core drill. Powdered samples are held in a plastic or similar vial for testing. The core from a core drill may be used directly with the instrument. In general, the instrument includes means for establishing a magnetic field in a preselected space, means for introducing a sample of the substance to be tested into the magnetic field, and means for indicating the change in the magnetic field caused by the introduction of the sample into the magnetic field.

In describing the instrument and its operation, the portion of the instrument utilized in testing a powdered sample is described first, the portion of the instrument used for testing a core sample is described next, and finally the metering circuit is described.

The means for establishing a magnetic field for the powdered sample is best shown in FIGS. 2, 3, 4 and 5 and includes a primary winding 11 and a secondary winding 12 of a transformer 15 concentrically arranged about a sleeve 14 of a spool 16. As shown, the secondary winding 12 is adjacent the sleeve 14, and the primary winding 11 is concentrically arranged about the secondary winding 12. The sleeve 14 is formed with a central vertically disposed opening 17 adapted to receive the sample being tested. The opening 17 is cylindrical in form and is sufficiently large to permit the ready insertion and removal of a vial containing the powdered sample. The magnetic circuitry comprises a magnetic core 21, having a generally rectangular shape diametrically encircling the primary winding 11 and the secondary winding 12 except where separated axially thereof at opposite faces of such windings or coils between confronting arcuate faces 22 and 23 of the magnetic core, and in alignment with the opening 17 so as to permit reception of the sample.

The magnetic core 21 is formed from two U-shaped members 26 and 27 disposed in opposed, spaced relation. The member 26 includes spaced arms 28 and 29 and a bridging portion 31 (FIG. 6). The member 27 includes spaced arms 32 and 33 and a bridging member 34. The members 26 and 27 are arranged so that the arms 28 and 32 and the arms 29 and 32 are in spaced opposed relation. The arms 28 and 32, in this instance, are in a horizontal position and overlie the windings 11 and 12; and the arms 29 and 33 are also in a generally horizontal relation and are beneath the windings 11 and 12. The bridging portions 31 and 34 are on diametrically opposed sides of the windings 11 and 12 and, in this instance, are in a vertical position. The ends of each arm 28, 29, 32 and 33 are preformed in a generally concave manner to permit reception of the cylindrical sample vial.

The laminations forming the core may be secured together in any conventional manner, such as by screws 37 (FIG. 3) or the like extending through the laminations.

As shown in FIG. 1, the windings 11 and 12 and the magnetic core are secured to the front of the instrument in a suitable enclosure 39. As shown the top 40 of the enclosure has an opening 41 facing upwardly and in alignment with the central opening 17. The bottom 42 of the enclosure is solid and in effect provides a bottom to the opening 17. Thus, the opening 17, the opening 41, and the bottom 42 form a cavity conveniently referred to as an "analyzer cavity" for the reception of the sample. Any suitable means may be utilized for securing the powder analyzer unit to the front of the instrument.

As seen in FIGS. 5 and 6, when the sample is in position to be tested, the sample, the magnetic core, and the primary and secondary windings 11 and 12 in effect define a shell-type transformer with the sample forming the center leg of the transformer.

The primary winding 11 is adapted to be connected to a suitable source of power, in this case a secondary winding 47 of a transformer 48 through conductors 49 and 51 (FIG. 2). The primary winding 52 of the transformer 48 is adapted to be connected to a 110-volt power supply by conductors 53 and 54. A fuse 56 may be connected in the conductor 53 and an "on-off" switch 57 may be disposed in the conductor 54.

Figure 9:
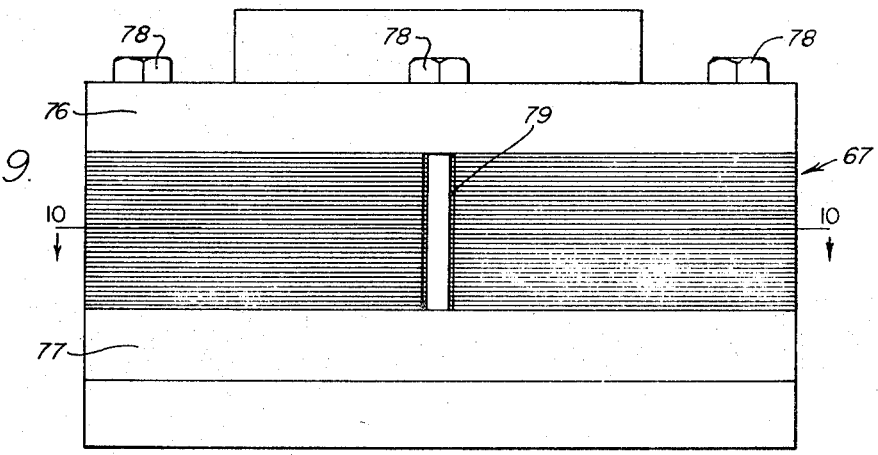
FIG. 9 is a side view of the unit shown by FIG. 8.
Figure 10:
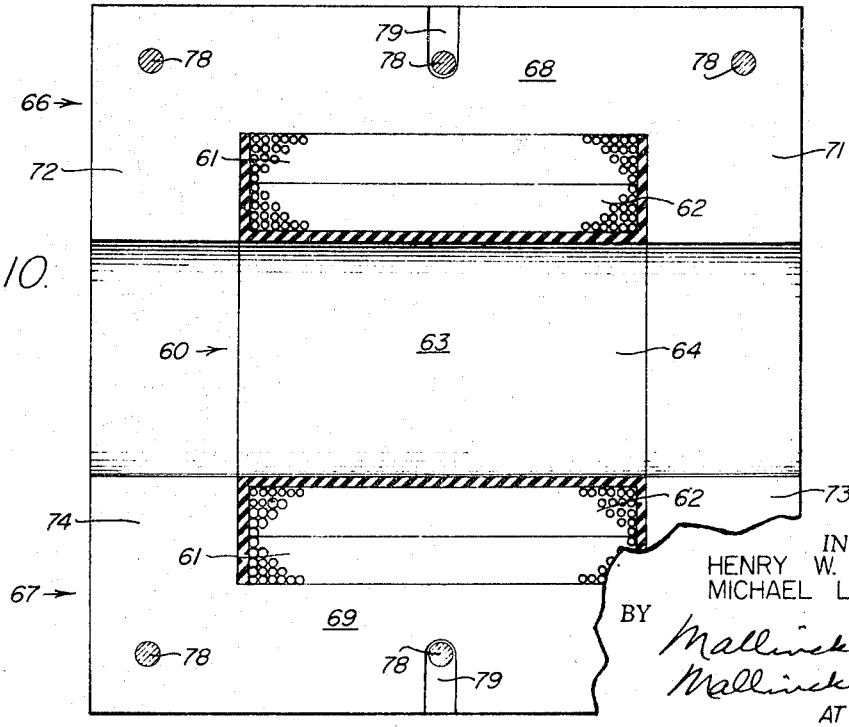
FIG. 10 is a sectional view taken along the lines 10—10 of FIG. 9.

The means for establishing the magnetic field for a core sample is shown in FIGS. 8, 9 and 10. This means has the same general construction as the means for establishing the magnetic field for a powdered sample, the difference being only in the size of the components. Thus, the means for establishing the magnetic field for a core sample includes a primary winding 61 and a secondary winding 62 of a transformer 60 formed on spool 63, with the secondary winding being adjacent the sleeve of the spool 63 and the primary winding 61 being arranged outwardly about the periphery of the secondary winding 62. The spool 63 is formed with a central horizontal opening 64 of a size shaped to receive a core sample. A magnetic core encircles the primary and secondary windings 61 and 62 and is formed by two U-shaped members 66 and 67 having bridging portions 68 and 69, respectively. The U-shaped portion 66 has depending spaced arms 71 and 72, and the U-shaped portion 67 has upstanding spaced arms 73 and 74. The U-shaped members are associated so that the ends of arms 72 and 74 are in spaced opposed relation, and the ends of arms 71 and 73 are in opposed spaced relation. The ends of the arms are also preformed to accommodate reception of the core sample in the opening 64. The magnetic core and windings are disposed between plates 76 and 77 secured together by machine screws 78.

This assembly can best be described as a core tester unit and may be secured to the front of the instrument by the machine screws 78 extending through slots 79 on the instrument or other suitable means. The core tester is preferably arranged so that the opening 64 is in a horizontal position so that other components on the front of the instrument do not interfere with the insertion and removal of a core in the opening 64.

The primary winding 61 of the transformer 60 is adapted to be connected to the secondary winding 47 of the transformer 48 (FIG. 2), by conductors 49 and 50 and by conductor 55, a selector switch 89 and conductor 51.

In normal use, only one sample is tested at a time so that by proper switching of the currents, only one metering circuit is required for testing either a powdered sample or a core sample. Thus, as shown in FIG. 2, the metering circuit includes a rectifier 81, load resistors 82 and 83, a meter 84 and a biasing circuit 86 operatively connected with the analyzer units.

The rectifier 81, as shown, is a full wave bridge rectifier. One side of the rectifier 81 is connected to the secondary winding 12 of the powder analyzer circuit through a conductor 87, and the other side is connected to the powder analyzer circuit through a conductor 88, the multiple-contact selector switch 89 and a conductor 91. The rectifier 81 is also adapted to be connected to the secondary winding 62 of the core analyzer circuit through a conductor 92 and a conductor 93, the selector switch 89 and the conductor 91. When the powder analyzer unit is used, the output of the rectifier is connected to the load resistor 82 through a conductor 94, contacts on the selector switch 89 and a conductor 95. The other side of the rectifier 81 output is connected to the resistor 82 through the conductor 96 and a conductor 98. When the core analyzer circuit is used, one side of the rectifier 81 output is connected to the resistor 83 through the conductor 94, contacts on the selector switch 89 and a conductor 99. The other side of the output is connected to the resistor 83 through the conductor 96 and a conductor 101.

One side of the meter 84 is connected to the output through the conductor 94, a selector switch 102 and conductor 103.

As is well known, whenever a transformer is energized, a certain amount of power is required to energize the magnetic circuit. The flow of current in the primary winding, of course, causes a flow of current in the secondary winding. This current, unless compensation is made, causes an incorrect reading of actual conditions occuring in the circuitry. Accordingly, a biasing circuit means is provided herein to correct for this ambient current.

As shown herein, the biasing circuit includes a power supply 111, a rectifier 112, a capacitor 113, resistors 114 and 116 and a potentiometer 117.

In this embodiment, to simplify the number of components used, the power for the biasing circuit is taken from one side of the secondary winding 47 and a center tap 118 of the transformer 48 by conductors 119 and 121. The rectifier 112 is connected to the conductor 119. The capacitor 113 is connected between the rectifier 112 and conductor 121 by conductors 122 and 123. The resistor 114 is connected in series with the rectifier output by conductor 124, and the resistor 116 is connected between the conductor 121 and the resistor 114 by a conductor 126 and conductors 127 and 128.

The potentiometer 117 has one end connected to conductor 127 and the other end connected to the conductor 121. A center tap 131 on potentiometer 117 is connected to one side of the output of the rectifier 81 by a conductor 132 which is in turn connected to the conductor 96. The conductor 121 is connected to a movable tap 134 on potentiometer 136. One end of the potentiometer 136 is open, and the other end is connected to the meter 84 by a conductor 137.

In some instances, it may be desirable to have a continuous recording. Accordingly, provision is made for such a circuit. As shown in FIG. 2, the recording circuit includes a resistor 141, a potentiometer 142 and a recorder 143.

A center tap 144 (FIG. 1) of the potentiometer 143 is connected to the recorder 143 by a conductor 146. The other side of the recorder 143 is connected to one end of the potentiometer 142 by a conductor 147. One side of the resistor 141 is connected to the rectifier output by the conductor 96 and a conductor 148. The other side of the resistor 141 is connected to the potentiometer 142 by a conductor 149. Jacks 151 may be disposed on either side of the recorder 143, and a capacitor 152 may be placed across the recorder terminals.

The other side of the potentiometer 142 is adapted to be connected to the other side of the rectifier 81 output by a conductor 153, the selector switch 102 and a conductor 94.

While a variety of different components may be used, the following have been found to be satisfactory. The transformer 48 may be a Triade Filament transformer, Type F25X 115-v. to 15-v., 1.5 amp. The rectifier 81 may be a full wave Motorola HEP 175 rectifier. The rectifier 112 may be a half-way rectifier, Type IN697.

The resistor 82 may be 2700 ohms, and the resistor 83 may be a 100 ohms resistor. The resistor 141 may be 50 ohms. The resistor 114 may be 6800 ohms, and the resistor 116 may be 680 ohms.

The potentiometer 144 may be a 100K ohms potentiometer. The potentiometer 136 may be a 15K ohms potentiometer, and the potentiometer 117 may be a 1K ohms potentiometer.

The capacitors 113 and 152 may have a 50 microfarad rating.

The powder analyzer transformer windings 11 and 12 may be formed from No. 38 wire, and the resistance of the primary windings should be approximately 530 ohms and the secondary winding 130 ohms. The core analyzer transformer windings 61 and 62 may be formed from No. 38 wire; and the resistance of the primary winding is 400 ohms; and the resistance of the secondary winding is 60 ohms.

The sample vials may be one inch by one-half inch (1" x ½") Spex Industry vials made by Spex Industries, Inc., P.O. Box 798, Metuchen, N.J. The ammeter may be a Simpson 29T Taut band 0–25 DC microamp meter.

The operation of the aforedescribed instrument for determining the magnetic characteristics of a substance is apparent from the description, but is briefly summarized hereinafter.

Assuming that it is desired to determine the magnetic characteristics of powdered material, and that the recorder circuit is not being used, all of the switches are in the positions shown in FIG. 2. To obtain an accurate reading from a sample of material, it is desirable to finely grind the sample to approximately 100-mesh size. The sample is then tamped in a vial. In certain instances the operator may find it unnecessary to grind the sample so fine to obtain accurate measurements. The degree of grinding required is readily determined by experience.

The instrument is connected to a 110-volt power supply, and the switch 57 is turned to the "on" position. The selector switch 89 is turned to the "powder" position. This position may be indicated on the instrument by the word "powder" or by any other suitable designation. It is seen also that the switch 89 connects the secondary winding 12 of the powder analyzer circuit to the input of the rectifier 81 through the conductor 88, the selector switch 89 and the conductor 91 and the conductor 87.

The selector switch 89 also connects the load resistor 82 across the output of the rectifier 81 by the conductors 96 and 98 connected to the positive side of the rectifier output and the conductor 95, the selector switch 89 and the conductor 94 connected to the negative side of the rectifier 81 output. The meter 84 is connected between the negative side of the rectifier 81 output. The meter 84 is connected between the negative side of the rectifier 81 output and the biasing circuit 86.

Under the conditions assumed and with no sample in the analyzer cavity 17, a small current flows in the secondary winding 12 because of the power required to energize the magnetic core of the transformer 15. This causes a small current to flow in the meter circuit and in turn be indicated on the meter 84. The magnetic circuit has flux lines 160 approximately as shown in FIG. 6. There is a minimum of flux lines due to the large air gap between the ends of the arms 28 and 29 and the arms 32 and 33. The biasing circuit 86 is used to neutralize the effect of this small ambient current by providing a current flow opposite to that of the ambient current.

The biasing circuit obtains its power from the transformer 48 by being connected to one end of the secondary winding 47 of the transformer 48 and a center tap 118 on the secondary winding.

In effect, the alternating current is converted to direct current to oppose the flow of the ambient current. The capacitor 113 serves as a filter, and the resistor 114 provides a voltage drop. The resistor 116 is a load resistor and is connected in parallel with the potentiometer 117. The center tap 131 (FIG. 1) on the potentiometer is adjusted until no flow of current is indicated on the meter. Thus, the ambient current is neutralized.

Each instrument is supplied with standard samples. These samples contain a predetermined quantity of magnetite. Commonly, a 30%, a 50%, a 60% and a 100% sample are provided. While the standard sample is in the analyzer cavity, the center tap 134 (FIG. 1) on the potentiometer 136 is adjusted until a full scale reading is shown on the meter 84. Under these conditions, the flux lines 160a of the magnetic circuit are substantially as shown in FIG. 7. The iron in the sample provides a better pathway for the lines of flux. Thus, a sample with magnetic material produces more flux lines than are present when no sample is in the instrument. It is this difference that is observed.

The standard sample is removed, and the sample to be tested is inserted in the analyzer cavity. The deflection of the meter 84 is noted. A reading is obtained and checked against a standard calibration curve, such as shown in FIG. 11.

The calibration curves are obtained in the manner set forth herein for testing a sample, except that samples of known magnetic characteristics are used and the curves plotted. By providing the user of each instrument with several standards, the instrument can be quickly adjusted for use with any of the calibrated curves.

After a reading of the test sample is obtained, the sample is removed; and the meter 84 is again noted to see whether the needle on the meter has returned to zero. If it has not, the instrument is again adjusted as described and another reading obtained. The average of the readings may then be used.

If it is desired to test a core sample, the selector switch 89 is turned to "core sample." As can be seen, the circuitry is changed so that the core analyzer circuit is energized, and the core sample is placed in the core analyzer cavity 64. The procedure for testing the core is the same as that described hereinbefore for testing powder samples.

If it is desired to use the recorder 143, it is only necessary to turn the selector switch 102 to its other position. This opens the meter 84 circuit and puts the recorder circuit across the output of the rectifier 81.

Thus, it is seen that a very useful instrument has been developed, and one that can be used in the field as well as in the laboratory. One of the important advantages of this instrument is that when used in the field, the results are obtainable in minutes as compared to days with existing methods utilizing laboratory techniques. Also, it is seen that the instrument is rugged, has a minimum of moving parts and is comparatively inexpensive to produce.

Reference herein to details of the preferred embodiments is not intended to limit the scope of the invention except insofar as these details are recited in the appended claims. Many modifications which fall within the broad scope of the invention will occur to those skilled in the art.

I claim:

1. An instrument for measuring the magnetic properties of a substance containing or thought to contain a magnetic material, said instrument comprising in combination:
   a secondary coil open through its center to receive a sample of the substance;
   a primary coil disposed concentrically around said secondary coil;
   a magnetic core surrounding said coils diametrically thereof but separated axially thereof to form openings registering with the opening through said secondary coil so as to receive and closely accommodate said sample as the center leg of a shell-type transformer provided by the coils, the magnetic core, and the received sample;

means for supplying power to said primary coil to energize the magnetic core; and electrical measuring means connected with said secondary coil and responsive to the presence of magnetic material in said sample.

2. An instrument as described in claim 1, wherein the magnetic core comprises a first and a second U-shaped member, each having a pair of extended arms and a bridging portion, said U-shaped members being so disposed in mutually spaced relationship about the concentric primary and secondary coils that the ends of the arms of the first U-shaped member lie adjacent to the ends of the arms of the second U-shaped member in end-to-end spaced apart relationship, said arms traversing both opposite faces of the primary and secondary coils, and said ends of the arms definng the openings at both of said opopsite faces of said coils registering with the center openng through said secondary coil for receiving the sample.

3. An instrument as described in claim 1, wherein the electrical measuring means comprises a rectifier circuit connected to the secondary coil, and means responsive to said rectifier circuit for indicating change in the magnetic field when a sample is in said opening.

4. An instrument as described in claim 3, wherein said means for indicating change in the magnetic field comprises an ammeter.

5. An instrument as described in claim 3, wherein said means for indicating change in the magnetic field comprises a recorder.

6. An instrument as described in claim 1, including an adjustable biasing means comprising a circuit connected to said power source and an ammeter, said circuit providing a basing current through an interconnector with said rectifier circuit, said biasing current producing a zero reading on the ammeter when no sample is in said opening.

7. An instrument as described in claim 1, wherein the openings in the magnetic core and the secondary coil are cylindrical in shape.

8. An instrument as described in claim 7, wherein the opening is adapted to receive a sample in powder form confined within a cylindrical container.

References Cited

UNITED STATES PATENTS

| | | | |
|---|---|---|---|
| 2,334,393 | 11/1943 | Dillon | 324—14 |
| 2,451,596 | 10/1948 | Wheeler | 324—3 |
| 2,680,833 | 6/1954 | Rothacker | 324—14 |
| 2,779,916 | 1/1957 | Poole | 324—34 |
| 2,799,823 | 7/1957 | Shaw et al. | 324—.5 |
| 2,904,745 | 9/1959 | Bugg | 324—14 |
| 3,058,054 | 10/1962 | Henderson | 324—14 |
| 3,324,386 | 6/1967 | Bruce | 324—14 |
| 3,395,339 | 7/1968 | Brown | 324—40 |

FOREIGN PATENTS

| | | |
|---|---|---|
| 637,857 | 3/1962 | Canada. |

OTHER REFERENCES

Lamoreaux, W. G., Core Testing Device, IBM Technical Disclosure Bulletin, vol. 2, No. 5, February 1960, pp. 92 and 93.

GERARD R. STRECKER, Primary Examiner